United States Patent [19]

Mayr et al.

[11] Patent Number: 4,906,067

[45] Date of Patent: Mar. 6, 1990

[54] OPTICAL CABLE COMPRISING A PLURALITY OF BUNDLE ELEMENTS

[75] Inventors: Ernst Mayr, Starnberg; Ulrich Oestreich, Munich, both of Fed. Rep. of Germany

[73] Assignee: Siemens Aktiengesellschaft, Berlin and Munich, Fed. Rep. of Germany

[21] Appl. No.: 322,411

[22] Filed: Mar. 13, 1989

[30] Foreign Application Priority Data

Mar. 31, 1988 [DE] Fed. Rep. of Germany ....... 3811126

[51] Int. Cl.⁴ ............................................. G02B 6/44
[52] U.S. Cl. ................................................. 350/96.23
[58] Field of Search ..................................... 350/96.23

[56] References Cited

U.S. PATENT DOCUMENTS

| | | | |
|---|---|---|---|
| 4,629,285 | 12/1986 | Carter et al. .................. | 350/96.23 |
| 4,696,541 | 9/1987 | Haag et al. .................... | 350/96.23 |
| 4,709,984 | 12/1987 | Oestreich et al. ............. | 350/96.23 |
| 4,752,112 | 6/1988 | Mayr ............................. | 350/96.23 |
| 4,767,184 | 8/1988 | Ogasawara et al. ........... | 350/96.23 |
| 4,802,732 | 2/1989 | Fukuma et al. ................ | 350/96.23 |
| 4,820,014 | 4/1988 | Nishimura et al. ............ | 350/96.23 |

*Primary Examiner*—Frank Gonzalez
*Attorney, Agent, or Firm*—Hill, Van Santen, Steadman & Simpson

[57] ABSTRACT

An optical cable comprising a plurality of bundle elements, each of which contains a plurality of light waveguides loosely arranged inside a deformable protective sheath. The light waveguides are combined in the form of light waveguide pairs and are fashioned as flat, ribbon-like structures, which are mobile in a radial direction relative to one another and relative to the outer sheath of the bundle element. The protective sheath is expediently composed of a rubber-elastic material, whose modulus elasticity is selected to be in a range of 50–500 N/mm².

12 Claims, 1 Drawing Sheet

OPTICAL CABLE COMPRISING A PLURALITY OF BUNDLE ELEMENTS

BACKGROUND OF THE INVENTION

The present invention is directed to an optical cable having a plurality of bundles of elements with each bundle comprising a plurality of light waveguides arranged within a deformable protective sheath.

An optical cable having a plurality of bundles with each bundle having a plurality of light waveguides arranged within a deformable protective sheath is disclosed in U.S. Pat. No. 4,696,541, whose disclosure is incorporated by reference and which claims priority from German Application No. 32 47 090. The individual light waveguides are accommodated loosely and independent of one another in the inside of a common protective sheath. A cushioning protective thread that is supported against the inside wall of the protective sheath is wound around all of these light waveguides.

A number of demands must be met for structuring optical cables comprising a great plurality of light waveguides, for example for local telephone networks. These demands include a small cable cross section which is desirable so that the fiber density should be selected as great as possible. The manufacturing cost must be low and, therefore, the manufacturing machines dare not be expensive. In addition, the distinguishability and manipulability of the light waveguide should be assured to an optimally far-reaching degree and a good branchability of the light waveguide should be guaranteed given an optimally short splicing time.

SUMMARY OF THE INVENTION

The object of the present invention is to create an optical cable that meets the demands mentioned hereinabove to an optimally great extend and in a simple way. In an optical cable having a plurality of bundles with each bundle having a plurality of light waveguides arranged within a deformable sheath, the present invention is achieved in that the light waveguides are mechanically combined in the form of pairs of light waveguides and in that the individual pairs of light waveguides are arranged to be movable in a radial direction relative to one another and relative to the outer, highly elastic protective sheath.

Since the pairs of light waveguides are not excessively broad and can still be bent relatively well in both axial directions without mechanical or other difficulties occurring, the employment of pairs of light waveguides has many advantages. In the terms of twistability, such a pair of light waveguides hardly differs from that of an individual fiber. In addition, the mutual displacement of a pair is relatively good, this being of great significance for the compensation of motion events, for example when fabricating the cable or when laying the cable. Another advantage of this structure is that the pair arrangements, by contrast to individual light waveguides, are relatively easy to recognize and can be manipulated quickly, for example for sorting or splicing, etc. In addition, by limiting the number of fibers per ribbon to two, the probability of faulty pair locations, given common splices, is greatly reduced in comparison to ribbons comprising four or more fibers. In addition, such a paired basic element represents an ideal branching element because at least two light conductors must be branched off in a normal case It is expedient, when the protective sheath is composed of a rubber-elastic material whose modulus of elasticity is selected to be in a range between 50 and 500 $N/mm^2$. This protective sheath can thereby be largely adapted to the three-dimensional conditions established inside the cable core, for example, by an appropriately sector-shaped shaping, so that the exploitation of cross sections within the cable can be kept higher than usual. The shaping inside the cable core assures a certain mobility of the light waveguide and this is guaranteed to an adequate degree in the solution of the invention by the paired arrangement of the light waveguides and by their mobility relative to one another and relative to the outer protective sheath. The resiliency of the protective sheath prevents seizing of the pairs of light waveguides and enables a low energy deformation of the bundle of elements for the purpose of a high packing density in the cable cross section without having a noticeable deteriorating effect on the inside volume.

Other features and advantages of the present invention will be readily apparent from the following description of the preferred embodiments, the claims and drawings.

DESCRIPTION OF THE PREFERRED EMBODIMENTS

Figure 1:
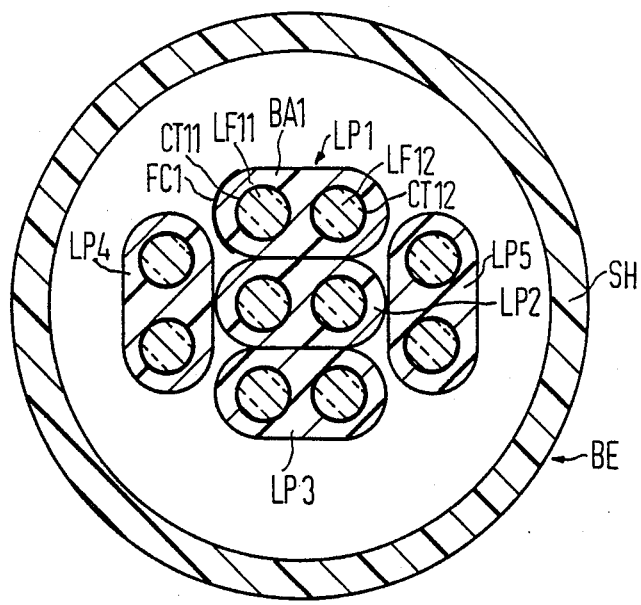
FIG. 1 is an enlarged cross sectional view through a bundle element having the paired waveguides in accordance with the present invention; an FIG. 2 is a partial cross sectional view of an optical cable constructed of the bundle elements of FIG. 1.

The principles of the present invention are particularly useful when incorporated in a bundle element, generally indicated as BE in FIG. 1. The bundle element BE has a tubular protective sheath SH, whose wall thickness is selected to be in a range of between 10% and 20% of the outside diameter of the bundle element. The material of this outside protective sheath is composed of a rubber-elastic material and has a modulus of elasticity in a range of between 50 and 500 $N/mm^2$. Thermoplastically deformable polyurethane or polyester rubbers are particularly suitable as the sheath material because these substances can be stretched within broad limits, can be compressed and twisted, and are insensitive to the standard filling compounds for the optical leads or fibers.

In the present exemplary embodiment, five light waveguide pairs LP1–LP5 are arranged in the inside of the protective sheath SH, namely such that an optimally space-saving configuration will be obtained overall. It is expedient to arrange between 2 and 20 light waveguide pairs inside the protective sheath SH, whereby five or six pairs can be preferably accommodated inside a protective sheath SH. In the present case, this means that three of the light waveguide pairs, namely LP1–LP3, are stacked on top of one another, whereas the two other light waveguide pairs LP4 and LP5 are positioned at the ends of the stack to form a basic arrangement.

The individual light waveguides, for example LF11 and LF12, in a light waveguide pair LP1 are held together by a common covering BA1 that, for example, is composed of an ultraviolet curable acrylate or the like and is preferably composed of a relatively soft compound in any case. It is also possible to join the individual light waveguides, for example LF11 and LF12, only by an adhesive material in the region of their common contacting location with one another. The outside contour of the light waveguide pair should be optimally smooth. The light waveguides LF11 and LF12 are built as optical transmission elements and are provided with a protective coating CT11 and CT12, respectively.

The corner regions of the light waveguide pairs LP1-LP5 are optimally rounded off to a great extent. This leads to a better gliding or movement of the pairs relative to each other in the sheath SH and to a more favorable utilization of the space. The light waveguide pairs LP1-LP5 exhibit a relatively loose packing density, for example the dead space within the protective sheath SH lies in a range of between 40% and 80%. An optimally soft and pasty filling compound can also be provided in the interior of the protective sheath SH.

The dimensions of the bundles element BE have an inside diameter in a range of 1.2 to 1.8 mm. Preferably, the inside diameter is 1.5 mm. The bundled element BE has an outside diameter in a range of between 1.7 and 2.5 mm. Preferably, the outside diameter is 2.1 mm.

The manufacture of the bundled element BE of FIG. 1 can occur in two steps. The first step is the light waveguides are first combined in pairs and are provided with a common envelope BA1 or with a hot-melt adhesive. It is, thereby, expedient to provide the envelope of the light waveguide pair with a corresponding color coding, for example at a narrow side or end with a colored strip FC1 which assures a distinguishability of the two light waveguides LF11 and LF12, as well as with the light waveguide pair, such as LP1. The second step is to manufacture a protective sheath SH expediently, which occurs with a simple extruder line having a filling means.

It is also possible to combine the two manufacturing events, for example to first carry out the combination of light waveguides to form light waveguide pairs and to, subsequently, surround the light waveguide pairs with a filling compound and with a common protective sheath in a continuous arrangement or process.

Figure 2:
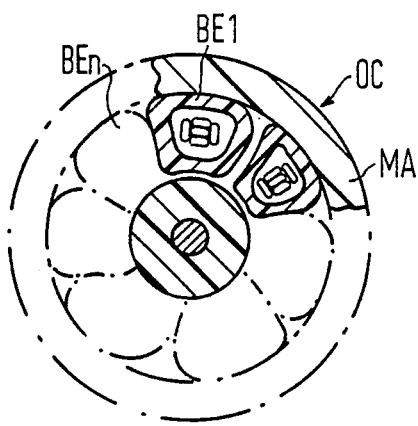

In order to provide an optical cable OC, according to FIG. 2, a plurality of the bundled elements of FIG. 1 must be combined into a cable and must be surrounded with an outer protective cladding MA. Since the protective sheath SH is composed of a rubber-elastic material, the stranding of the individual bundle elements BE1, BE2, etc., through BEn can be carried out in a simple manner. This stranding can expediently occur in, preferably, a long Lang's lay without backtwist or in an SZ method, which has an alternating twist direction, whereby the outer cladding MA can also be simultaneously applied. The stranding and cladding do not require any special machines or apparatus.

Preferably, the dimensions for the bundled elements can be set as follows: fiber pairs, for example LP1 joined with ultraviolet-curable acrylate and having a size of 0.3 mm × 0.6 mm = 0.18 mm². Fiber light waveguide pairs LP1-LP5, potentially with filling compound, are provided in a sheath SH having an inside diameter of 1.5 mm and an outside diameter of 2.5 mm. The dead space will be approximately 60%.

Especially advantageous structures are configurations of stranding patterns of 1+5, 1+6, 2+7, 2+8, 3+8, 3+9, 4+9, 4+10, 5+10, 1+5+10, 1+5+11, 1+6+11, 1+6+12, 2+7+11 bundle elements BE. When an additional core, for example a tensile core, is provided, combinations of 3, 4 or 5 bundle elements can be advantageously utilized. Each of these stranding patterns mentioned above can be manufactured in a simple working cycle, namely with the same twist direction of both the inside layer and outside layer.

As illustrated in FIG. 2, the outer shape of the protective sheath of the bundle element BE1-BEn is largely matched to the conditions and assumes an approximately sector-shaped shape. This is possible in an especially good fashion when the protective sheaths are composed of a rubber-elastic material having a modulus of elasticity in a range of between 50 and 500 N/mm².

It is also possible to join individual light waveguide pairs LP1-LP5 of FIG. 1 to one another via a small, thin band in the fashion of a film-like hinge. These small bands must be fashioned so thin that mobility of the individual light waveguide pairs relative to one another is not deteriorated.

Although various minor modifications may be suggested by those versed in the art, it should be understood that we wish to embody within the scope of the patent granted hereon all such modifications as reasonably and properly come within the scope of our contribution to the art.

We claim:

1. In an optical cable comprising a plurality of bundle elements, each bundle element having a plurality of light waveguides arranged within a deformable plastic sheath, the improvements comprising the light waveguides being mechanically combined in the form of light waveguide pairs, and the individual light waveguide pairs of a bundle element being arranged radially movable relative to one another and relative to an outer, highly elastic plastic protective sheath of the bundle element, said protective sheath being composed of a rubber-elastic material and having a modulus of elasticity in a range of between 50 and 500 N/mm².

2. In an optical cable according to claim 1, wherein the light waveguides of a light waveguide pair are held together by a common coating.

3. In an optical waveguide according to claim 3, wherein said common coating is composed of an ultraviolet-curable acrylate.

4. In an optical cable according to claim 1, wherein the light waveguides of each pair are joined together by an adhesive material.

5. In an optical cable according to claim 1, wherein the light waveguide pairs are provided with a color coating to make each pair distinguishable from one another.

6. In an optical cable according to claim 1, wherein the light waveguide pairs are not stranded with one another.

7. In an optical waveguide cable according to claim 1, wherein the individual bundle elements are stranded to one another in a Lang's lay, preferably without a backtwist.

8. In an optical cable according to claim 1, wherein the individual bundle elements are stranded with an alternating twist direction.

9. In an optical cable according to claim 1, wherein the wall thickness of the protective sheath is selected to be in a range of 10%-20% of the outside diameter of the bundle element.

10. In an optical cable according to claim 1, wherein a dead space within each bundle element is selected to be in a range of 40%-80%.

11. In an optical cable according to claim 11, wherein the dead space is approximately 60%.

12. In an optical cable according to claim 1, wherein each bundle element has five pairs arranged inside the sheath of the bundle element.

* * * * *